(12) United States Patent
Dockweiler et al.

(10) Patent No.: US 10,195,927 B2
(45) Date of Patent: Feb. 5, 2019

(54) PIVOTABLE MOTOR VEHICLE TAILGATE

(71) Applicant: Bayerische Motoren Werke Aktiengesellschaft, Munich (DE)

(72) Inventors: Achim Dockweiler, Munich (DE); Nicholas Aldersley, Hebertshausen (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 15/788,021

(22) Filed: Oct. 19, 2017

(65) Prior Publication Data

US 2018/0037096 A1 Feb. 8, 2018

Related U.S. Application Data

(63) Continuation of application No. PCT/EP2016/058830, filed on Apr. 21, 2016.

(30) Foreign Application Priority Data

Apr. 24, 2015 (DE) .......................... 10 2015 207 556

(51) Int. Cl.
*B62D 25/00* (2006.01)
*B60J 5/10* (2006.01)
(Continued)

(52) U.S. Cl.
CPC ................. *B60J 5/101* (2013.01); *B60J 5/12* (2013.01); *E05B 83/20* (2013.01); *E05F 15/60* (2015.01); *E05Y 2900/546* (2013.01)

(58) Field of Classification Search
CPC ........... B60J 5/101; E05F 15/60; E05B 83/20; E05Y 2900/546
(Continued)

(56) References Cited

U.S. PATENT DOCUMENTS 3,716,945 A * 2/1973 Cooper .................... B60J 5/106
296/56
4,413,854 A 11/1983 Hirshberg
(Continued)

FOREIGN PATENT DOCUMENTS

DE 93 10 058 U1 9/1993
DE 44 00 374 A1 7/1995
(Continued)

OTHER PUBLICATIONS

International Search Report (PCT/ISA/210) issued in PCT Application No. PCT/EP2016/058830 dated Jul. 29, 2016 with English translation (Six (6) pages).
(Continued)

*Primary Examiner* — Jerry E Redman
(74) *Attorney, Agent, or Firm* — Crowell & Moring LLP

(57) ABSTRACT

In order to improve comfort when loading a motor vehicle which has a pivotable tailgate with a first tailgate element and a second tailgate element arranged thereon, the first tailgate element has a first region which can be mounted so as to be pivotable about a first pivoting axis arranged in the upper region of the vehicle body. The first tailgate element has a second region which lies opposite its first region and on which a second pivoting axis is arranged. The second tailgate element has a first region which is mounted so as to be pivotable about the second pivoting axis. The second tailgate element has a second region which lies opposite its first region and can be locked to a lower region of the vehicle body. At the second pivoting axis there is a pivoting angle between the first tailgate element and the second tailgate element with a positive rotational direction from the second tailgate element in the direction of the first tailgate element. The second tailgate element is arranged at a negative pivoting angle with respect to the first tailgate element, the absolute value of which pivoting angle is larger in the (Continued)

non-pivoted state of the second tailgate element than in its pivoted state.

13 Claims, 4 Drawing Sheets

(51) Int. Cl.
  *B60J 5/12* (2006.01)
  *E05F 15/60* (2015.01)
  *E05B 83/20* (2014.01)
(58) Field of Classification Search
  USPC .............................................. 296/55, 56, 50
  See application file for complete search history.

(56) References Cited

U.S. PATENT DOCUMENTS

| | | | | |
|---|---|---|---|---|
| 4,688,844 | A * | 8/1987 | Hirose | B60J 5/101 296/106 |
| 6,068,327 | A * | 5/2000 | Junginger | B60J 5/101 160/213 |
| 6,174,015 | B1 * | 1/2001 | Shave | B60J 5/101 296/55 |
| 6,318,782 | B1 * | 11/2001 | Suzuki | B60J 5/106 296/106 |
| 6,454,341 | B2 * | 9/2002 | Tolinski | B60J 1/1861 296/106 |
| 6,877,791 | B2 * | 4/2005 | Greuel | E05F 15/622 296/146.1 |
| 7,069,695 | B2 * | 7/2006 | Hattori | E05F 15/619 296/146.4 |
| 9,428,944 | B1 * | 8/2016 | Elia | B60J 5/104 |
| 9,637,955 | B2 * | 5/2017 | Elia | E05B 85/045 |
| 9,783,028 | B1 * | 10/2017 | Papanikolaou | B60J 5/106 |
| 2002/0038963 | A1 * | 4/2002 | Moon | B60J 5/101 296/146.8 |
| 2011/0121600 | A1 * | 5/2011 | Cimrman | B60J 5/101 296/56 |
| 2015/0376929 | A1 * | 12/2015 | Scheuring | E05F 15/622 74/89.38 |
| 2017/0275931 | A1 * | 9/2017 | Iacovoni | E05B 83/20 |

FOREIGN PATENT DOCUMENTS

| | | |
|---|---|---|
| DE | 197 32 864 A1 | 2/1999 |
| DE | 10 2005 037 957 A1 | 2/2007 |
| DE | 10 2005 050 419 A1 | 5/2007 |
| DE | 10 2005 037 957 B4 | 1/2011 |
| EP | 0 159 017 A2 | 10/1985 |
| JP | 2005-299232 A | 10/2005 |
| JP | 2009-209653 A | 9/2009 |

OTHER PUBLICATIONS

German-language Written Opinion (PCT/ISA/237) issued in PCT Application No. PCT/EP2016/058830 dated Jul. 29, 2016 (Five (5) pages).

German-language Search Report issued in counterpart German Application No. 10 2015 207 556.7 dated Oct. 14, 2015 with partial English translation (Thirteen (13) pages).

* cited by examiner

PIVOTABLE MOTOR VEHICLE TAILGATE

CROSS REFERENCE TO RELATED APPLICATIONS

This application is a continuation of PCT International Application No. PCT/EP2016/058830, filed Apr. 21, 2016, which claims priority under 35 U.S.C. § 119 from German Patent Application No. 10 2015 207 556.7, filed Apr. 24, 2015, the entire disclosures of which are herein expressly incorporated by reference.

BACKGROUND AND SUMMARY OF THE INVENTION

The present invention relates to a pivotable tailgate for a motor vehicle and to a motor vehicle equipped with the pivotable tailgate.

DE 10 2005 037 957 B4 discloses a pivotable tailgate for a motor vehicle of the type in question. The tailgate has a first tailgate element and a second tailgate element, which is arranged on the first, and, in the closed state of the tailgate or of the vehicle body, the two tailgate elements together form a single plane. The first tailgate element has a first region, which is mounted in a pivotable manner about a first pivot pin, which is arranged in the upper region of the vehicle body. The first tailgate element also has a second region, which is located opposite its first region and on which a second pivot pin is arranged. The second tailgate element, for its part, has a first region, which is mounted in a pivotable manner about the second pivot pin of the second region of the first tailgate element. Finally, the second tailgate element has a second region, which is located opposite its first region and can be locked to a lower region of the vehicle body.

In the case of this known pivotable tailgate, the first tailgate element and the second tailgate element form a single plane when the tailgate is closed. In this case, the pivot angle, that is to say the angle defining the pivot position between the first tailgate element and second tailgate element, with a positive direction of rotation from the second tailgate element in the direction of the front region of the motor vehicle and of the first tailgate element, is 0°. When the tailgate is opened, the second tailgate element pivots from said starting position into a position in which it essentially butts against the underside of the first tailgate element, wherein the pivot angle becomes ever greater. In other words, the first tailgate element and the second tailgate element are oriented in opposite directions when the tailgate is open, wherein the second tailgate element is arranged at a pivot angle of 180° in relation to the first tailgate element.

It is the object of the present invention to provide an alternative to the prior art.

This and other objects are achieved in that the second tailgate element is arranged, in relation to the first tailgate element, at a negative pivot angle of which the magnitude is greater in the non-pivoted state of the second tailgate element than in the pivoted state thereof. This advantageously provides a pivotable tailgate which has a quite different body shape from the vehicle body which is known from the prior art. When the tailgate according to the invention is open, it is no longer the case that the first tailgate element and the second tailgate element are oriented in opposite directions; rather, they are designed to extend essentially in the same direction and give a quite different aesthetic appearance. Furthermore, it is advantageously the case that the arrangement of the first tailgate element and second tailgate element according to the invention, in addition to creating a space-saving arrangement of the tailgate in the pivoted or opened-up state, also increases the amount of space available between ground level (i.e. the road surface) and the tailgate, and this gives rise to a comparatively generously sized opening in the vehicle body.

The tailgate according to the invention has a further-improved aesthetic design if the magnitude of the pivot angle in the non-pivoted state of the tailgate differs from 0°, and is particularly preferably 75°.

A particularly advantageous configuration of the invention provides for the pivot angle between the first tailgate element and second tailgate element in the pivoted state of the tailgate to be essentially 55°. Therefore, a deviation of this pivot angle of particularly preferably +/−15°, and even more preferably of +/−7° to +/−10°, can always be considered as being disclosed within the context of the present invention.

It should be noted that the sizes of the first tailgate element and second tailgate element may also be different. Therefore, it is in particular advantageous if the length of the second tailgate element corresponds essentially to a third of the length of the first tailgate element.

The invention makes provision, on the second region of the first tailgate element and the first region of the second tailgate element, for at least one hinge, in which the second pivot pin is located. This results in a means which has proven itself in practice for the purpose of pivoting the tailgate in a reliable and precise manner.

Of course, the first tailgate element and the second tailgate element can be pivoted manually in relation to one another. However, this movement can particularly advantageously take place fully automatically, or in an assisted manner, by way of a drive, particularly preferably by a spindle drive, or alternatively by a rotary drive, if a drive which interacts with the first region of the second tailgate element is provided on the second region of the first tailgate element.

The aforementioned assisted or automated pivoting can be provided for in a straightforward and reliable manner by the drive being a spindle drive which acts on the first tailgate element and second tailgate element.

The first tailgate element is retained in a secure and reliable manner in relation to the second tailgate element, both in the fully pivoted state of the tailgate according to the invention and in the non-pivoted state or in any desired state therebetween, if at least one locking mechanism, preferably a lock, is provided on the second portion of the first tailgate element and the first portion of the second tailgate element.

The locking mechanism or the lock can be opened and closed manually. It is likewise advantageously possible to provide for said manual opening and closing movement of the at least one locking mechanism or lock to be assisted by a drive, preferably an electric motor, or to be fully automated by an electric drive.

The aforementioned object is likewise achieved by a motor vehicle having a pivotable tailgate of the type presented. The aforementioned advantages apply correspondingly.

In a particularly advantageous manner, the maximum height of the motor vehicle according to the invention with its tailgate according to the invention in the pivoted state is 2.10 m, particularly preferably 2.05 m, above ground level. This makes it possible, in particular in parking garages and underground parking lots, to create a comparatively generously sized opening in the motor vehicle without the opened-out tailgate striking against the ceiling of the parking garage or of the underground parking lot and therefore being damaged.

Other objects, advantages and novel features of the present invention will become apparent from the following detailed description of one or more preferred embodiments when considered in conjunction with the accompanying drawings.

DETAILED DESCRIPTION OF THE DRAWINGS

A detailed, non-prejudicial, in particular non-limiting, description of an exemplary embodiment of the present invention will be given hereinbelow with reference to FIGS. 1A to 2B. Unless stated otherwise, like elements are provided with identical reference signs.

Figure 1A:
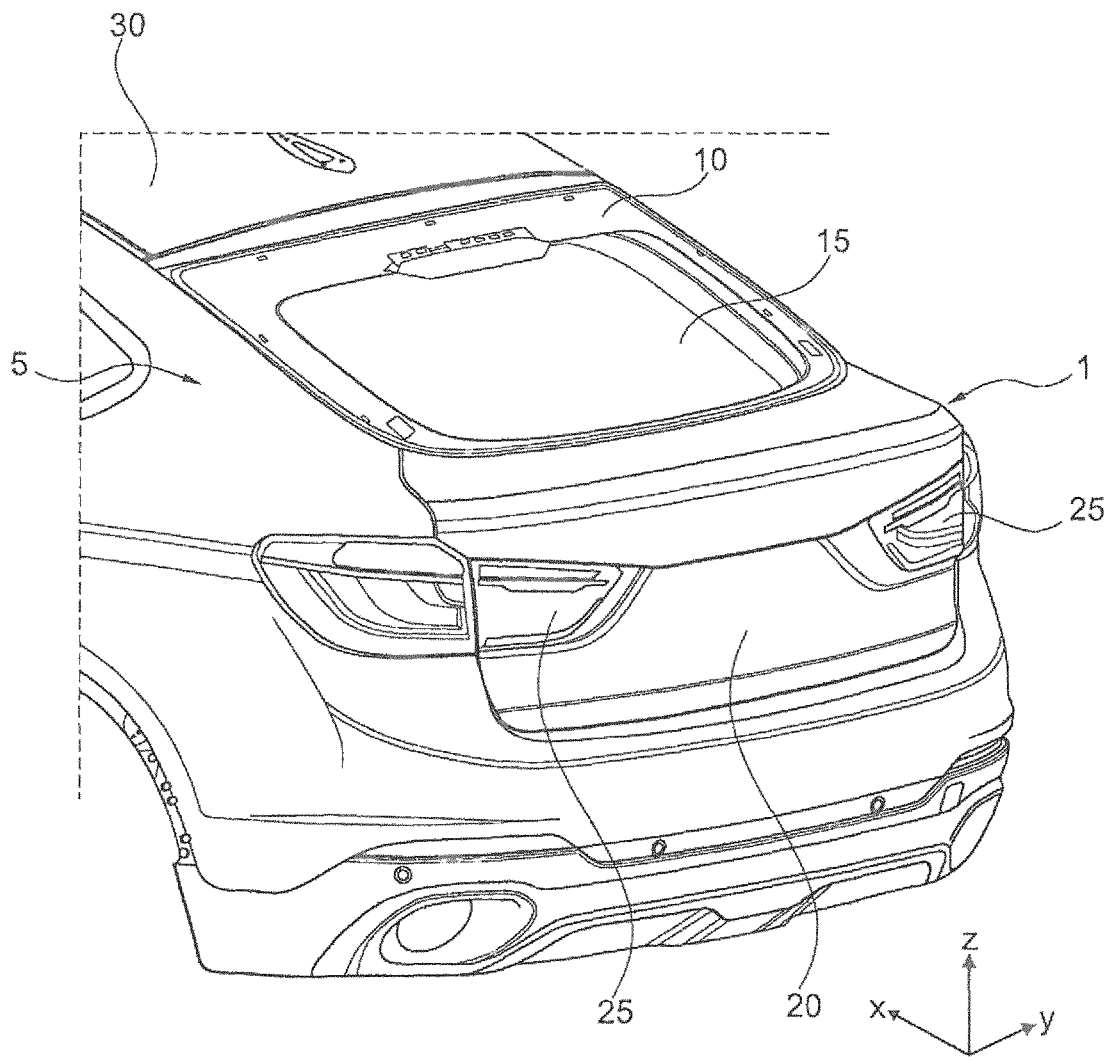
FIG. 1A is a perspective plan view of a partially illustrated motor vehicle according to the invention with a tailgate according to an embodiment of the invention in a non-pivoted state.

FIG. 1A shows a perspective plan view of a pivotable tailgate 1 in the non-pivoted state. The tailgate is fastened in a pivotable manner on a partially illustrated motor vehicle 5.

The tailgate 1 has a first tailgate element 10 and a second tailgate element 20. The first tailgate element 10, in this exemplary embodiment, contains a rear windshield 15. The second tailgate element 20, in this exemplary embodiment, has tail-lights 25. The first tailgate element 10 and the second tailgate element 20 are configured, and arranged on the body 30 of the motor vehicle 5, so as to underscore the coupe-like character of the motor vehicle 5. Of course, it is nevertheless also the case that other vehicle body types can be realized by means of the pivotable tailgate 1, by virtue of the first tailgate element 10 and the second tailgate element 20 having appropriate dimensions and being positioned and/or arranged appropriately in relation to one another. Furthermore, it is also possible to provide components other than the aforementioned rear windshield 15 or the aforementioned tail-lights 25, or even no such components at all.

Figure 1B:
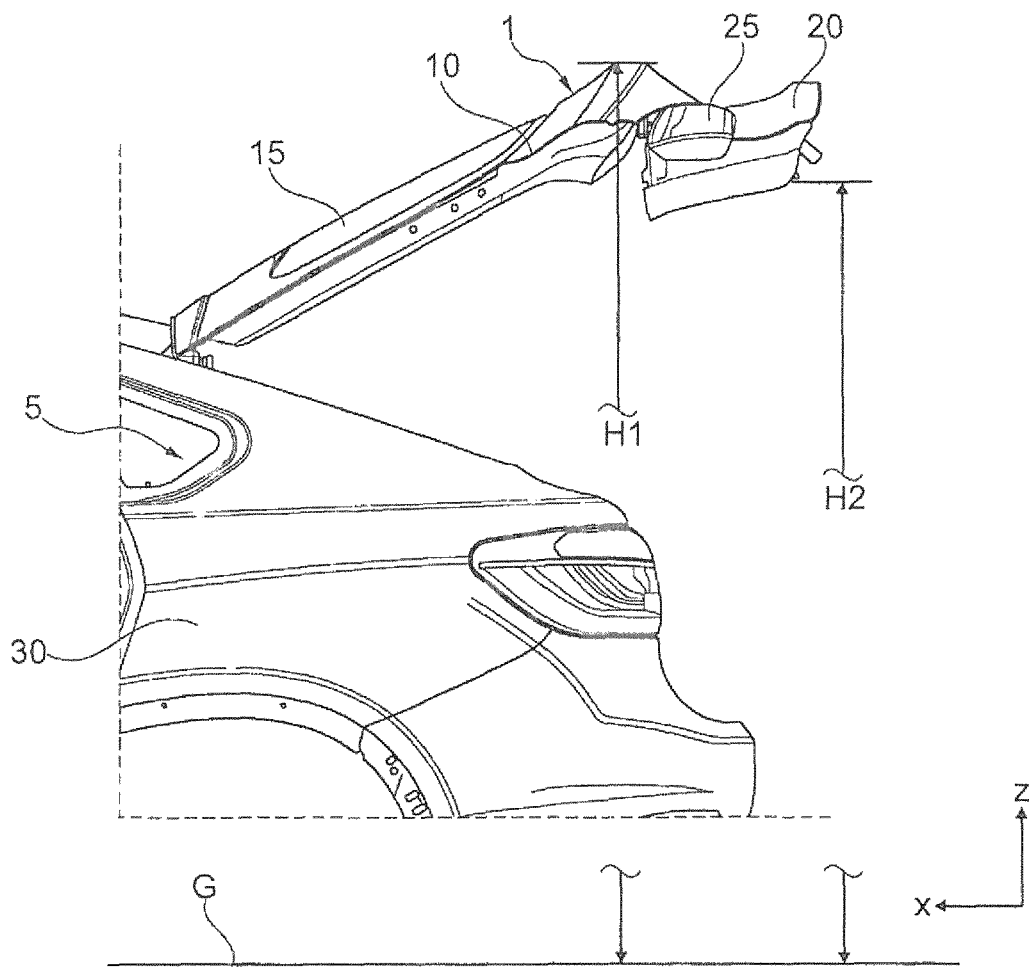
FIG. 1B illustrates a side view of the tailgate shown in FIG. 1A, this time in the pivoted state.

FIG. 1B shows a side view of the pivotable tailgate 1 in the state in which it is pivoted in relation to the vehicle body 30. Furthermore, it is also the case that the second tailgate element 20 has been pivoted in relation to the first tailgate element 10.

In this state, the maximum opening-out height H1, that is to say the maximum height which the motor vehicle 5 can attain, as measured above ground level G (i.e. above the road surface or above the ground), with the tailgate 1 opened up, is approximately 2100 mm, and therefore the tailgate 1 can be readily opened even in underground parking lots or parking garages.

The minimum stand-up height H2, that is to say the minimum height of the tailgate 1 in a rear region of the vehicle where a person (not shown here) can stand without bending, is approximately 1900 mm in this exemplary embodiment. It is thus advantageously possible even for relatively tall people to be able to stand, without bending, in the vicinity of the open rear region of the motor vehicle 5.

Furthermore, the given opening-out height H1 gives rise to a comparatively generously sized opening in the vehicle body 30.

Figure 2A:
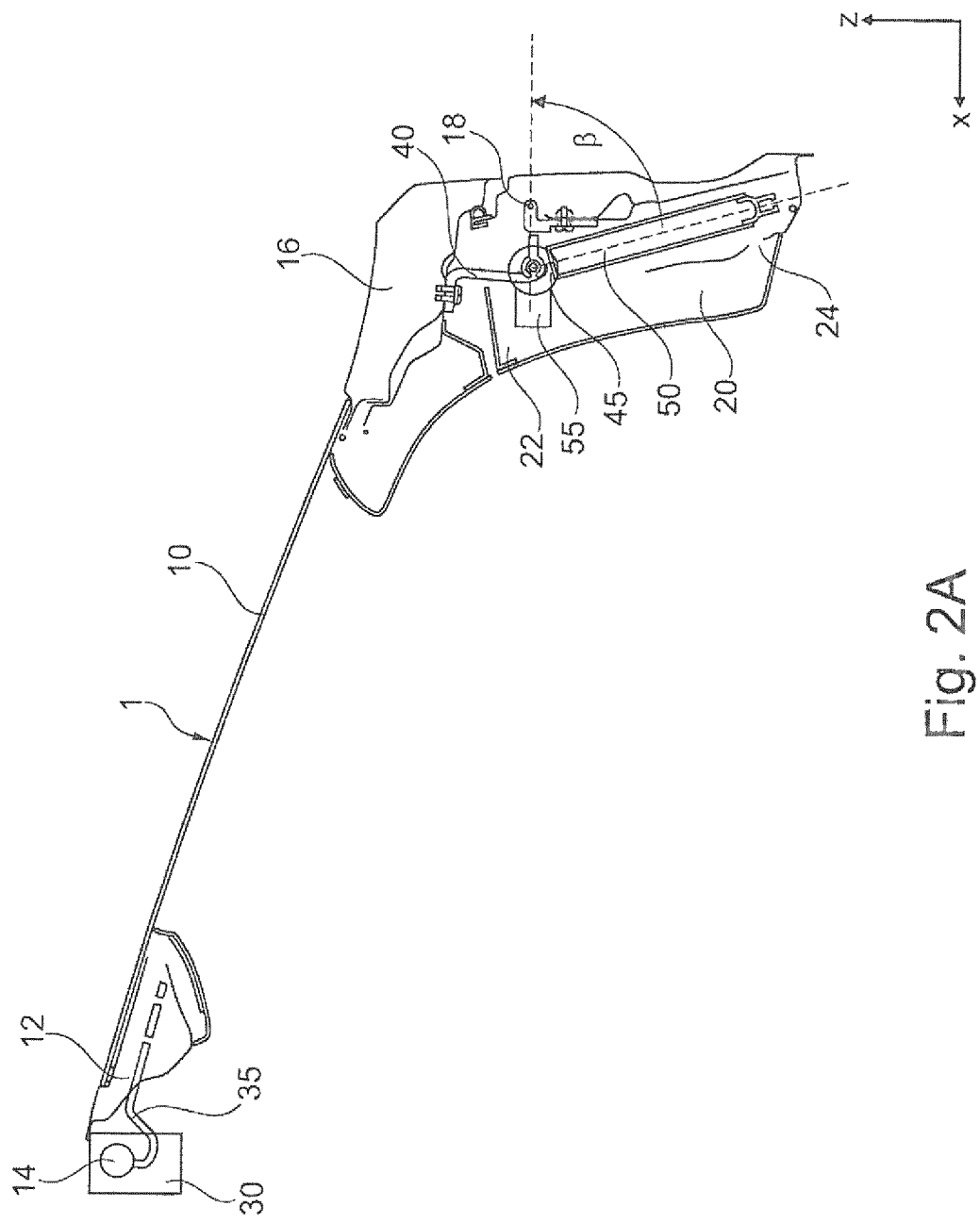
FIG. 2A illustrates a side view, in section, of the tailgate shown in FIG. 1A.

The pivotable tailgate 1 shown in FIG. 1A is illustrated once again, in a sectional side view, in FIG. 2A. The first tailgate element 10 has a first region 12, which is mounted in a pivotable manner about a first pivot pin 14, which is arranged in the upper region of the vehicle body 30. A second pivot pin 18 is arranged on its second region 16, which is located opposite the first region 12. The second tailgate element 20 has a first region 22, which is adjacent to the second region 16 of the first tailgate element 10. The second tailgate element 20 is mounted in a pivotable manner about the second pivot pin 18 of the second region 16 of the first tailgate element 10. The second tailgate element 20 has a second region 24, which is located opposite the first region 22. By means of a lock (not illustrated here), the second region 24, and therefore the second tailgate element 20, can be locked to the vehicle body 30 in a manner known per se.

While the tailgate 1 can be pivoted about the vehicle body 30 along the pivot pin 14 by means of a hinge 35 which is known per se, the second tailgate element 20 pivots about the first tailgate element 10, along the second pivot pin 18, about a hinge 40, which is fastened on the first tailgate element 10. It is possible, in principle, for the second tailgate element 20 to be pivoted manually in relation to the first tailgate element 10 about the pivot pin 18. In order to improve user comfort, this exemplary embodiment provides a drive 45 (illustrated merely symbolically), in particular an electric motor, which can act on a spindle of a spindle drive 50 which is known per se. This advantageously provides for a reliable opening and closing movement using means which have proven their worth in practice. In order to avoid unintended opening or closing, or pivoting, of the second tailgate element 20 in relation to the first tailgate element 10, a locking mechanism 55, in particular a lock, is provided and can lock the second tailgate element 20 in relation to the first tailgate element 10 in a manner which is known per se.

As can likewise be gathered from FIG. 2A, the first tailgate element 10 and the second tailgate element 20 are positioned at a pivot angle β in relation to one another. The pivot angle β represents the pivot position of the second tailgate element 20 in relation to the first tailgate element 10. It has a positive direction of rotation when the second tailgate element 20 moves in relation to the first tailgate element 10 in the direction of the x axis of the vehicle's own coordinate system (therefore in the direction of the front part of the motor vehicle 5). This means that, when the second tailgate element 20 pivots in the direction of the first tailgate element 10, the pivot angle β assumes a positive value, when the first tailgate element 10 and the second tailgate element 20 are located close up against one another in a state in which they are oriented in opposite directions. In the exemplary embodiment shown here, the pivot angle β therefore has a negative direction of rotation and a magnitude of approximately 75° in a non-pivoted state of the second tailgate element 20. It should be noted here that it is also possible, according to the invention, for the pivot angle β to be of any value other than 0° and to have a negative direction of rotation, in dependence on the desired vehicle-body shape and/or dimensions of the tailgate 1.

Figure 2B:
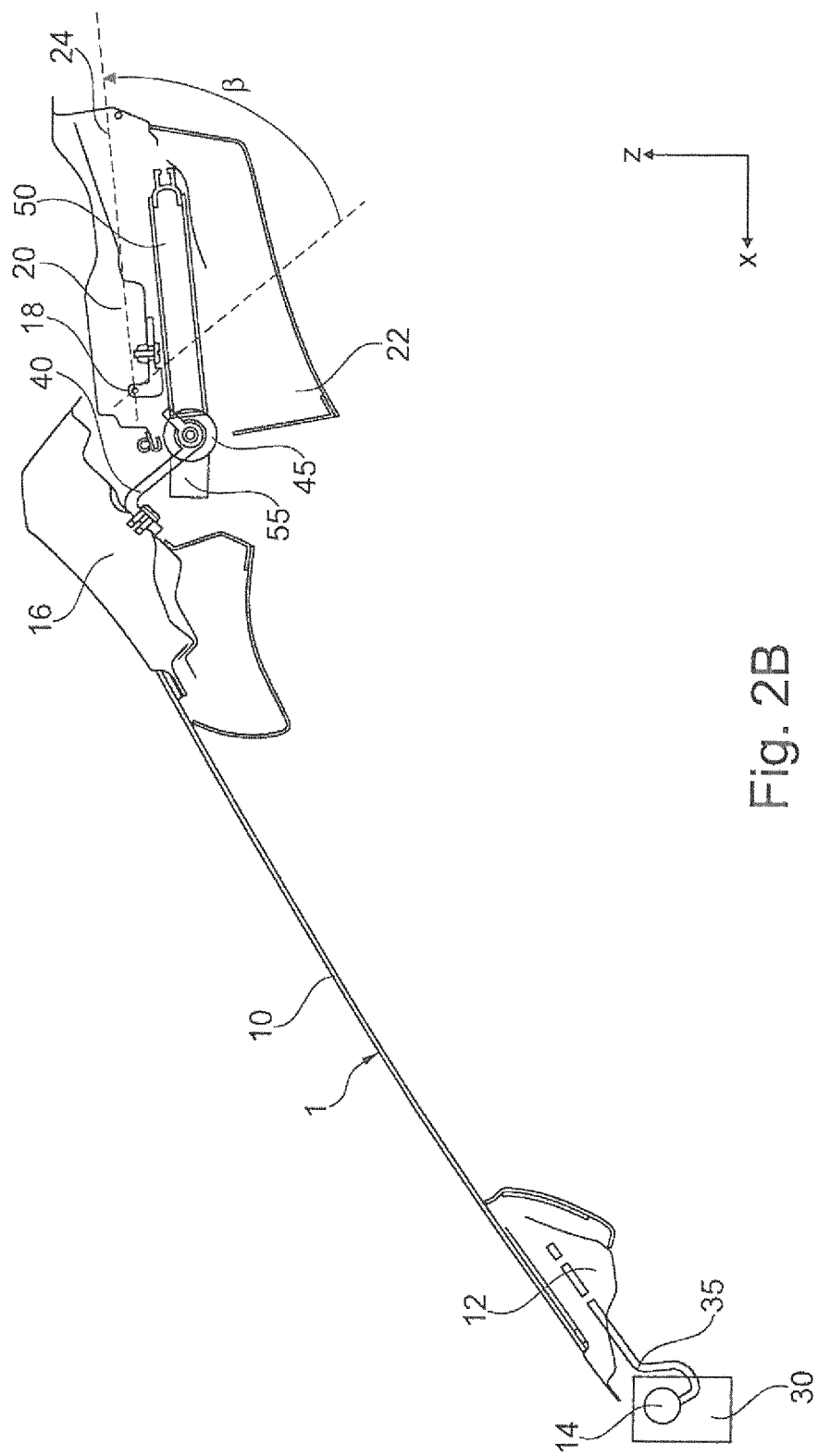
FIG. 2B illustrates a side view, in section, of the tailgate shown in FIG. 1B.

In FIG. 2B, then, the pivotable tailgate 1 shown in FIG. 2A is shown in the fully open state. This means that the first tailgate element 10 has been pivoted about the first pivot pin 14 by means of the hinge 35, which is located on the vehicle body 30. Furthermore, the second tailgate element 20 has been pivoted fully about the second pivot pin 18, the pivot angle β being approximately 55° in the exemplary embodiment shown here. This is not imperative however; it is also possible here for the pivot angle β to be of any other desired magnitude, as long as it is smaller than in the non-pivoted state of the second tailgate element 20. In particular, it is also possible for the pivot angle to deviate by particularly preferably +/−15°, and preferably +/−7° to +/−10°, from the aforementioned value.

It should be noted that the second tailgate element 20 can be pivoted independently of the first tailgate element. It is thus advantageously possible to provide for a through-passage opening in the vehicle body 30 by means of pivoting the second tailgate element 20, even when the first tailgate element 10 has not been pivoted.

LIST OF REFERENCE SIGNS

1 Tailgate
5 Motor vehicle
10 First tailgate element
12 First region of the first tailgate element
14 First pivot pin
15 Rear windshield
16 Second region of the first tailgate element
18 Second pivot pin
20 Second tailgate element
22 First region of the second tailgate element
24 Second region of the second tailgate element
25 Tail-light
30 Vehicle body
35 Hinge
40 Hinge
45 Drive
50 Spindle drive
55 Locking means
G Ground level
H1 Maximum opening-out height
H2 Minimum stand-up height
x,y,z Vehicle's own Cartesian coordinate system
β Pivot angle The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A pivotable tailgate for a motor vehicle, comprising:
a first tailgate element;
a second tailgate element, which is arranged on the first tailgate element, wherein
the first tailgate element has a first region, which is mountable in a pivotable manner about a first pivot pin, which is arranged in an upper region of a vehicle body,
the first tailgate element has a second region, which is located opposite its first region and on which a second pivot pin is arranged,
the second tailgate element has a first region, which is mounted in a pivotable manner about the second pivot pin,
the second tailgate element has a second region, which is located opposite its first region and is lockable to a lower region of the vehicle body,
at the second pivot pin, there is a pivot angle between the first tailgate element and second tailgate element with a positive direction of rotation from the second tailgate element in the direction of a front part of the motor vehicle and of the first tailgate element,
the second tailgate element is arranged, in relation to the first tailgate element, at a negative pivot angle of which a magnitude thereof is greater in a non-pivoted state of the second tailgate element than in the pivoted state thereof, and
when the first tailgate element is open, relative to the motor vehicle, a highest point of the first and second tailgate elements is on the first tail gate element.

2. The pivotable tailgate as claimed in claim 1, wherein the magnitude of the pivot angle in the non-pivoted state of the tailgate differs from 0°.

3. The pivotable tailgate as claimed in claim 1, wherein the magnitude of the pivot angle in the non-pivoted state of the tailgate is approximately 75°.

4. The pivotable tailgate as claimed in claim 1, wherein the pivot angle in the pivoted state of the second tailgate element is approximately 55°.

5. The pivotable tailgate as claimed in claim 1, wherein on the second region of the first tailgate element and the first region of the second tailgate element, at least one hinge is provided, in which the second pivot pin is located.

6. The pivotable tailgate as claimed in claim 1, further comprising:
a drive which interacts with the first region of the second tailgate element, the drive being located on the second region of the first tailgate element.

7. The pivotable tailgate as claimed in claim 6, wherein the drive is a spindle drive which acts on the first tailgate element and second tailgate element.

8. The pivotable tailgate as claimed in claim 1, further comprising:
at least one locking mechanism on the second portion of the first tailgate element and the first portion of the second tailgate element.

9. The pivotable tailgate as claimed in claim 8, wherein the at least one locking mechanism is actuated by a drive.

10. A motor vehicle, comprising a pivotable tailgate as claimed in claim 1.

11. The motor vehicle as claimed in claim 10, wherein a maximum height of the tailgate in the pivoted state is 2.10 m above ground level.

12. The motor vehicle as claimed in claim 10, wherein a maximum height of the tailgate in the pivoted state is 2.05 m above ground level.

13. The pivotable tailgate for a motor vehicle as claimed in claim 1, wherein a pivot angle of the second tailgate element is greater in a fully closed position of the second tailgate element than in a fully open position of the second tailgate element.

* * * * *